July 31, 1962  M. R. BADER  3,047,049
TIRE TREAD BUILDERS
Filed May 17, 1960  3 Sheets-Sheet 1

INVENTOR.
M. R. Bader
BY
ATTYS

July 31, 1962 M. R. BADER 3,047,049
TIRE TREAD BUILDERS
Filed May 17, 1960 3 Sheets-Sheet 3

United States Patent Office 3,047,049
Patented July 31, 1962

3,047,049
TIRE TREAD BUILDERS
Melvin R. Bader, Lodi, Calif., assignor to Super Mold Corporation of California, Lodi, Calif., a corporation of California
Filed May 17, 1960, Ser. No. 29,702
4 Claims. (Cl. 156—411)

This invention relates to a tire tread builder or stitcher of that general type which includes transversely extending stitching rollers to engage and press or stitch the camelback strip as the latter is applied to the rotatably mounted tire, and a swinging support for the rollers mounted behind the tire to be stitched in such a position that as the support is pulled forwardly the rollers will engage the camelback in stitching relation.

The major object of the present invention is to movably mount the rollers in connection with the swinging support and control the roller movement in such a manner that the axes of the rollers, regardless of their position laterally of the tire when engaged with the camelback, will always be maintained in planes radially of the tire. As a result the camelback will be stitched evenly from side to side as the tire rotates.

Another important result obtained by reason of the above recited feature of construction is that the stitching rollers are moved slightly ahead on the camelback as they engage the same, so as to have an improved smoothing-out action thereon.

A further object of the invention is to provide practical, reliable, and durable tire tread builders, and ones which will be exceedingly effective for the purpose for which they are designed.

These objects are accomplished by means of such structure and relative arrangement of parts as will fully appear by a perusal of the following specification and claims.

Figure 1:
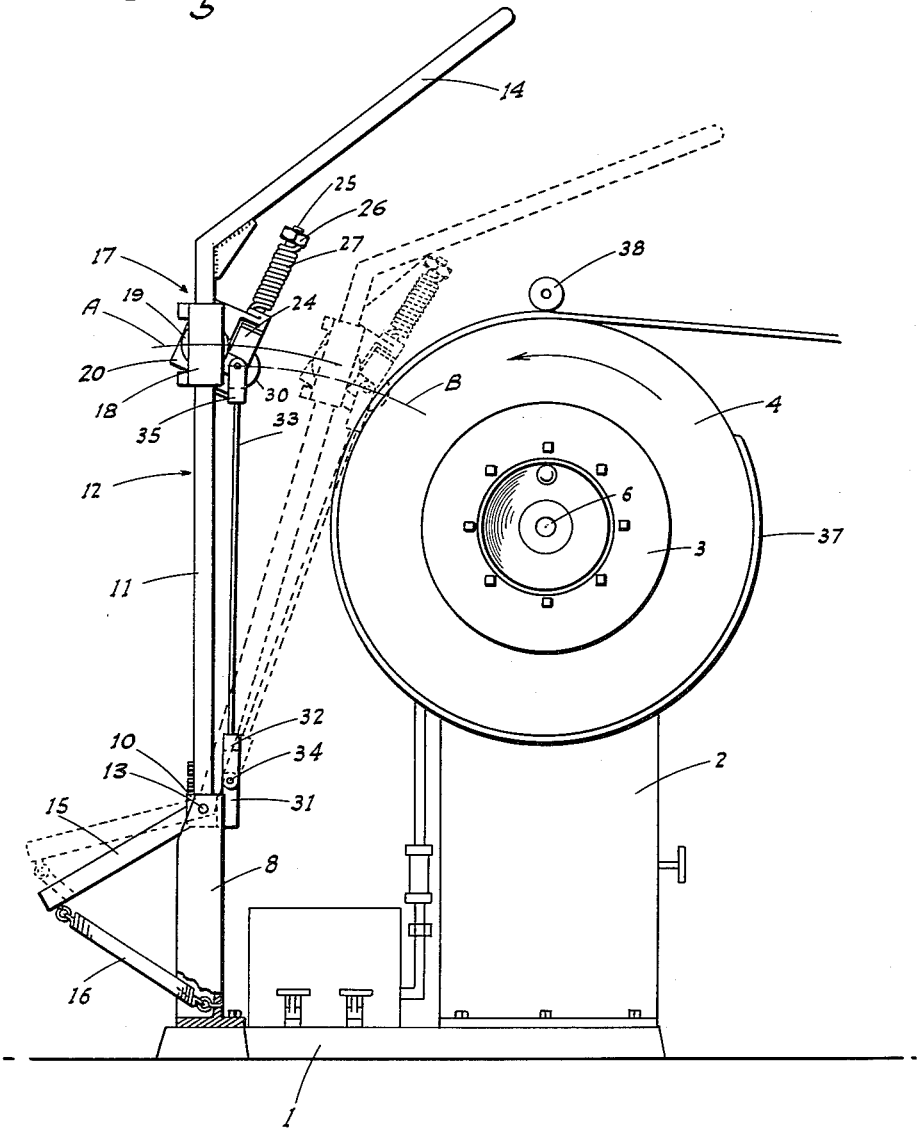
FIG. 1 is a side elevation of the improved tire tread builder in its initial or non-operative position; the operative position being shown in dotted lines.
Figure 2:
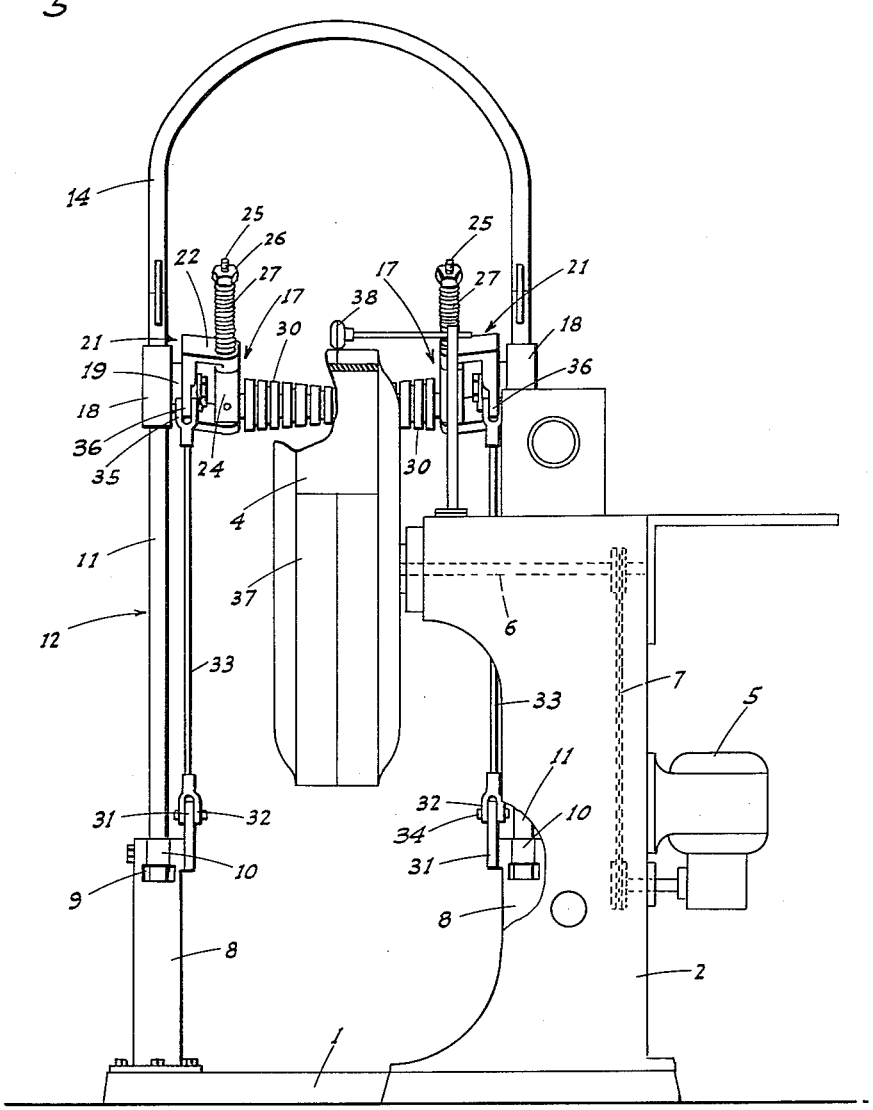
FIG. 2 is a front elevation of the structure, partly broken out.

Referring now more particularly to the drawings, and to the characters of reference marked thereon, the tread builder comprises a base 1 on which an upstanding pedestal 2 is mounted. The pedestal on one side supports a mounting wheel 3 for an inflated tire 4. This wheel is disposed with its axis horizontal and is driven so that the wheel and tire at the top turn toward the rear, as indicated by the arrow, by suitable means, such as a motor 5 connected to the wheel shaft 6 by a chain drive, indicated at 7.

Upstanding from and rigid with the base 1 rearwardly of the wheel and tire are transversely spaced posts 8, disposed symmetrically relative to the plane of the tire. These posts at the top are forked, as at 9, to receive the blocks 10 formed on the lower ends of the upstanding legs 11 of an elongated yoke 12; the blocks being pivoted to the forks by pins 13 which are parallel to the axis of wheel 3.

The legs of the yoke terminate in a forwardly projecting U-shaped handle portion 14 which overhangs the tire, as shown in FIG. 1, so that the yoke may be conveniently operated from in front of the tire. In order to yieldably hold the yoke against forward swinging from a vertical position, each block 10 is provided with a rigid rearwardly and downwardly angled arm 15; a normally slack tension spring 16 being connected between the outer end of the arm and the related post 8 adjacent the lower end thereof, as shown in FIG. 1.

The separate stitching-roller units, indicated generally at 17, are mounted on the yoke legs 11, and are identical except that they are of right and left hand form. Each unit comprises a sleeve 18 secured on the related leg 11 at a level near the top of the tire. The sleeve 18 is formed intermediate its ends with a disc or plate 19 facing the opposite leg and arranged for relative swivel engagement with the base 20 of a body 21 of yoke form extending generally vertically and including end ears 22.

The yoke or body 21 is pivoted to the plate 19 by a headed pin 23 relative turnable in the base 20 and secured in said plate. The ears 22 project in a direction away from the adjacent leg 11 with a slope forwardly or toward the tire, and a sleeve 24 extends between the ears at their outer or front end. The sleeve 24 is fixed on a rod 25 journaled in the ears 22 and projecting some distance above the upper ear.

An adjustable head 26 is mounted on the upper end of the rod 25; a helical torsion spring 27 on said rod extending between the head 26 and the adjacent ear 22 and being secured at one end to the head and at the other end to the ear. A stop unit 28 between the sleeve 24 and said ear 22 prevents rotation of said sleeve in one direction.

Fixed on the sleeve 24 and projecting therefrom and away from the pin 23 is a normally substantially horizontal transverse spindle 29. Said spindle, which is parallel to pin 23 in a horizontal plane transversely of tire 4, being supported from the forwardly offset ears 22, is thus offset radially of or eccentric to said pin forwardly or in the direction of the tire 4. A taper stitching roller unit is turnably mounted on spindle 29; this unit being preferably of the sectional yieldable rubber type shown in the copending application of Arnold Duerksen, Serial No. 29,701, filed May 17, 1960.

An ear 31 upstands from each post 8 to one side of and in front of the fork 9, and receives the clevis 32 of an upstanding tension rod or link 33; said ear and clevis being pivoted together by a pin 34 which is thus disposed in front of and above the pivot pin 13 of the main yoke 12, as shown.

Figure 3:
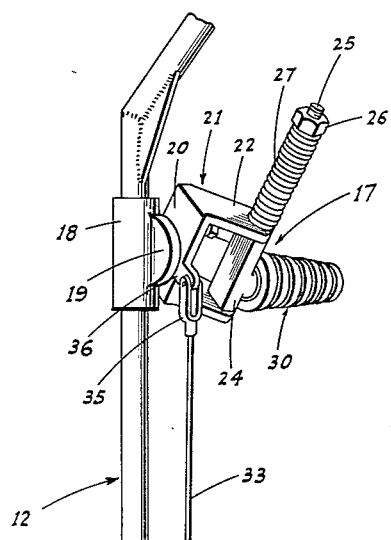
FIG. 3 is a perspective view of one of the stitching units together with its mounting and control means.
Figure 4:
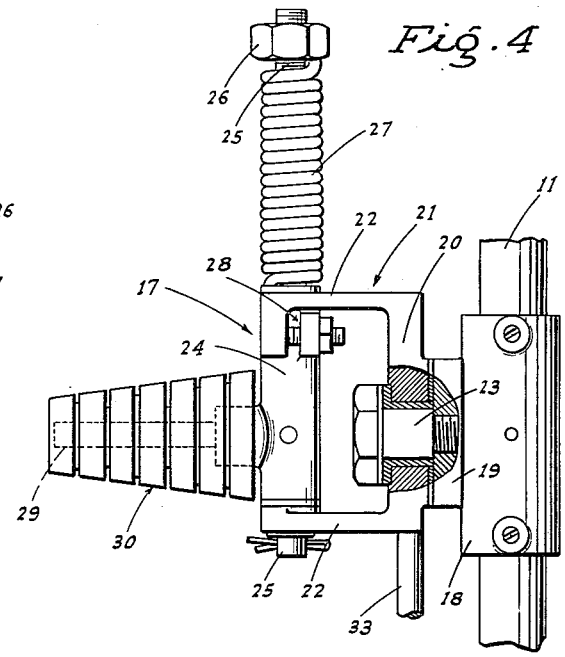
FIG. 4 is a fragmentary enlarged rear elevation of one of the stitching units, partly broken away and in section.
Figure 5:
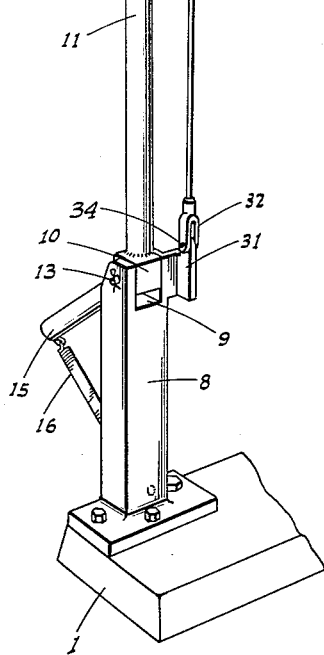
FIG. 5 is an exploded perspective view of the mounting connections for one leg of the main yoke and the control link of the related stitching unit.
Figure 5:
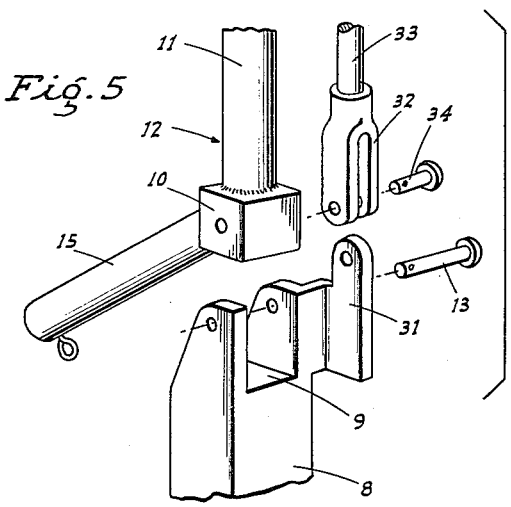

A similar clevis 35 on the upper end of rod 33 engages and is pivoted to an ear 36 projecting forwardly from the base 20 of yoke 21; the point of pivotal connection of the clevis 35 with said ear 36 being substantially axially alined with the spindle 29, and which is below the pivot 23 of the yoke 21 as most clearly shown in FIG. 3. The distance between the upper and lower pivots of each rod or link 33 is thus less than the distance between the pivot 13 of the yoke 12 and the pivot 23 of the related body or yoke 21.

The stitcher is of course used in connection with the application of a camelback strip 37 about the tire; a centering roller 38 mounted in connection with the wheel 3 aiding the operator in feeding the camelback onto the tire in laterally centered relation thereto.

In the operation of the stitching device the handle 14 is pulled forwardly so as to bring the stitching rollers 30 into pressing contact with the camelback; the rollers swinging upwardly about the axis of the rods 25 against the resistance of the springs 27 as the forward pull on the yoke 12 is continued after the rollers once engage the camelback.

It will be noted that as the main yoke 12 is thus swung forwardly from its initial position, the axes of the yokes 21 on which the stitching rollers are mounted move through an arc A concentric with the pivot pins 13 of the main yoke 12. At the same time, the yokes 21 are swung upwardly somewhat relative to yoke 12 about the pivot pins 23 and move through an arc B which is concentric with the pivot pins 34 of the links 33. This relative upward movement of yokes 21 and the parts connected thereto is occasioned by the forward positioning of the pivot pins 34 of links 33 relative to the pivot pins 13 of the main yoke 12, and of the forward positioning of the upper end pivots of said links relative to the yoke pivot pins 23.

As a result of the difference in alinement and length of the radii of the two arcs A and B relative to each other, as clearly shown in FIG. 1, the axes of the stitching rollers 30, as they swing up laterally, are maintained in a transverse plane radially of the tire irrespective of the extent of swinging movement of the main yoke 12. This assures of the camelback being pressed or stitched evenly from side to side as the tire rotates. Also, it will be noted that the stitching rollers, due to the above described difference in relationship of the arcs A and B, are being moved slightly circumferentially of the tire in a direction opposite that in which the tire is rotating. As a result, the stitching rollers, when pressingly engaged with the camelback, exert a smoothing-out action thereon in a circumferential direction.

From the foregoing description it will be readily seen that there has been produced such tire tread builders as will substantially fulfill the objects of the invention as set forth herein.

While this specification sets forth in detail the present and preferred construction of such tire tread builders, still in practice such deviations from such detail may be resorted to as do not form a departure from the spirit of the invention, as defined by the appended claims.

Having thus described the invention, the following is claimed as new and useful, and upon which Letters Patent are desired:

1. A tread builder comprising a pedestal, a rotary wheel journaled on the pedestal with its axis horizontal and disposed to support a tire vertically for the application of camelback to the periphery thereof, a main upstanding yoke including legs connected together at their upper end for manual manipulation, means pivoting the legs at their lower end parallel to the wheel axis in transversely symmetrical relation to the wheel supported tire rearwardly thereof and laterally out therefrom, stitching units mounted on the legs and including transverse-axis stitching rollers facing each other in end to end relation and at a height to engage a tire toward the top thereof, means to drive the wheel to rotate the same and the tire in a direction such that the upper portion of the tire turns rearwardly, and means acting on the units upon forward swinging of the yoke to cause the rollers contacting the camelback to be shifted circumferentially of the tire in a direction opposite that of the rotation of the wheel.

2. A tread builder comprising a supporting structure which includes a pedestal, a rotary wheel journaled on the pedestal with its axis horizontal and disposed to support a tire vertically for the application of camelback to the periphery thereof, a main upstanding yoke including legs connected together at their upper end for manual manipulation, means pivoting the legs at their lower end on the supporting structure parallel to the wheel supported tire rearwardly thereof and laterally out therefrom, stitching units mounted on the legs and including stitching rollers facing each other transversely of the tire in end to end relation and at a height to engage a tire toward the top thereof, means to drive the wheel to rotate the same and the tire in a direction such that the upper portion of the tire turns rearwardly, the units each including a body on which the related roller is supported, means mounting the bodies on the yoke legs for rotation about an axis parallel to that of the wheel and tire, said rollers being forwardly of such axis, and means connected to and extending between each body and the supporting structure functioning upon forward swinging of the yoke to rotate the bodies in a direction such that upon the rollers contacting the camelback, said rollers will also be moving circumferentially of the tire in the direction opposite that of the rotation thereof.

3. A tread builder comprising a pedestal, a rotary wheel journaled on the pedestal with its axis horizontal and disposed to support a tire vertically for the application of camelback to the periphery thereof, a main upstanding yoke disposed rearwardly of the pedestal and wheel, said yoke including transversely spaced legs connected together at their upper end for manual manipulation and disposed laterally out from the adjacent sides of the wheel and tire, fixed posts having pivot means for the lower ends of the yoke legs, said pivot means being parallel to the wheel axis, stitching units mounted on the legs, each unit including a body, means pivoting the body on the related leg, said pivot means being parallel to the axis of the wheel, a spindle disposed in forwardly offset relation to said pivot means and normally projecting transversely from the body toward the other leg, an elongated stitching roller turnable on the spindle, means pivoting the spindle at at its laterally outer end on the body for yieldably resisted upward tilting movement relative to the body, and control means connected to the body and to the related post and arranged upon forward swinging of the yoke to rotate the body about the pivot means thereof sufficiently to maintain the axis of the roller in planes radially of the wheel irrespective of the extent of such swinging movement of the yoke.

4. A structure, as in claim 3, in which said last named means comprises a link depending from the body and pivotally connected thereto at a point in front of the axis of rotation thereof, and means pivoting the link at its lower end on said post in front of and above the yoke pivot means and relatively close thereto.

References Cited in the file of this patent

UNITED STATES PATENTS

| | | |
|---|---|---|
| 1,331,657 | Macbeth | Feb. 24, 1920 |
| 1,368,393 | Griffiths | Feb. 15, 1921 |
| 1,671,940 | Stevens | May 29, 1929 |
| 2,529,739 | Powers | Nov. 14, 1950 |